United States Patent [19]

Madsen

[11] 3,952,406

[45] Apr. 27, 1976

[54] METHOD OF SECURING THE ROTOR WINDING OF A TURBO-GENERATOR ROTOR

[75] Inventor: Kristian Dahl Madsen, Vasteras, Sweden

[73] Assignee: Allmanna Svenska Elektriska Aktiebolaget, Vasteras, Sweden

[22] Filed: July 14, 1975

[21] Appl. No.: 595,620

Related U.S. Application Data

[62] Division of Ser. No. 448,367, March 5, 1975.

[52] U.S. Cl. .............................. 29/598; 29/421 R; 310/42; 310/43; 310/214
[51] Int. Cl.² ...................................... H02K 15/14
[58] Field of Search ............ 29/596, 598, 605, 606, 29/421; 310/42, 43, 214, 215, 265

[56] References Cited
UNITED STATES PATENTS

| 3,624,432 | 11/1971 | Merz | 310/214 |
|---|---|---|---|
| 3,775,842 | 12/1973 | Sheldon et al. | 29/606 |

FOREIGN PATENTS OR APPLICATIONS

| 2,060,361 | 6/1972 | Germany | 310/214 |

Primary Examiner—Carl E. Hall

[57] ABSTRACT

A turbo-generator with a rotor winding includes a plurality of slots in which the rotor windings are inserted and a plurality of slot wedges, at least two slot wedges lying in each slot on the outside of the winding and being electrically connected with each other. A plurality of relatively thin pressure tubes of a deformable material such as copper are positioned in the slots between the wedges and the windings. Thereafter, the pressure tubes are supplied with a thermosetting resin through feed tubes, the resin being supplied at a sufficient pressure and in a sufficient amount to produce an expansion of the space within the tube by at least 50 per cent. The feed tube is then subjected to heat in a localized area, thus accelerating the curing of the resin in this area of the tube and forming a plug, after which the supply of pressure to the pressure tube is disconnected. After the resin in the pressure tube has hardened, the feed tube is removed.

2 Claims, 7 Drawing Figures

METHOD OF SECURING THE ROTOR WINDING OF A TURBO-GENERATOR ROTOR

This is a division of application Ser. No. 448,367, filed Mar. 5, 1974.

BACKGROUND OF THE INVENTION

1. Field of the Invention

The present invention relates to a turbo-generator rotor provided with a plurality of winding slots in which a rotor winding is secured by means of a plurality of axially and consecutively arranged metallic slot wedges, a plurality of slot wedges, lying in one and the same slot, being electrically connected to each other by means of an elongated short-circuiting member lying in the slot.

Furthermore, the invention relates to a method of securing the winding in the winding slots of a rotary electrical machine by injecting a pressure medium into an elongated hollow body arranged between the winding and the slot wedge.

2. The Prior Art

The use of a fluid as pressure medium with a view to exerting a pressure on the winding of a synchronous machine, and thus securing the winding in the slot, is known from the German Offenlegungsschrift No. 1,816,283, Swiss Patent No. 393,505 and French Patent No. 1,501,011.

In all known cases, it is a question of retaining stator windings. Elastic tubes are used, which are blown up with a pressure of 2 – 5 kg/cm². The pressure medium is gas or fluid, and the pressure system is permanently connected to a pump and a pressure regulator.

An arrangement of this kind cannot be used, however, for securing the winding of a rotor, and especially not when it is a question of turbo-generator rotors, since these rotors are subjected to extremely great centrifugal forces. Furthermore, it would hardly be possible to control the pressure of the pressure medium during operation.

SUMMARY OF THE INVENTION

According to the invention a reliable securing of the winding of a turbo rotor is achieved without the use of hydraulic means which operate during machine operation.

One object of the invention is an improved securing means for the rotor winding of a turbo-generator.

Another object of the invention is a damping winding comprising said securing means.

A third object of the invention is a method for the manufacturing of a machine furnished with the securing means mentioned above.

These results are achieved according to the invention by providing, in each of the winding slots, in which the coils of the winding are arranged, a plurality of slot wedges which are spaced along the length of the slot and which are electrically connected to each other. Between the slot wedges and the windings there are arranged thin pressure tubes of a deformable material such as copper, each of these pressure tubes bridging two or more of the slot wedges. The pressure tubes are supplied through feed tubes connected to the interior thereof from a source of thermosetting resin under a sufficient pressure and in a sufficient quantity to cause the space within the pressure tube to increase by at least 50 percent. This then applies a pressure on the coils of the winding.

When sufficient resin has been introduced, the feed tube is heated locally to form a plug of solid resin therein and the pressure supply of resin is disconnected. When the resin in the pressure tube has hardened, the feed tube is removed.

BRIEF DESCRIPTION OF THE DRAWINGS

In the following, the invention will be described with reference to the accompanying drawings, in which.

DESCRIPTION OF THE PREFERRED EMBODIMENT

Figure 1:
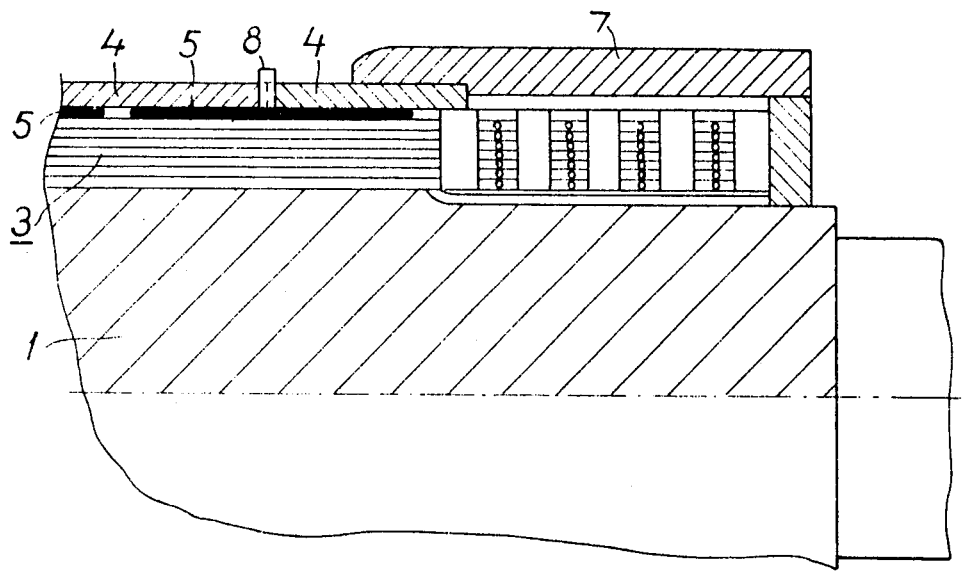
FIG. 1 shows an axial section through a rotor according to the invention.

In the drawing, 1 designates the rotor body of a turbo-generator and 2 are winding slots for the rotor winding. Each slot contains one side of a multiple-turn rotor coil 3. Each winding slot 2 is sealed by means of a plurality of axially and consecutively arranged slot wedges 4 of non-magnetic material with high electrical conductivity, for example brass. The slot wedges lying in the same slot are connected in series with each other by means of low-resistive connections, namely pressure tubes 5, of copper or aluminium, which are filled with solidified thermosetting or roomtemperature curing resin 6. At each end of the rotor, the slot wedges of the slot ends are electrically joined to each other by means of the stainless steel winding capsules 7, which then act as short-circuit rings and together with the slot wedges form a damping winding.

The pressure tube necessary for the method is suitably manufactured by providing an annealed copper tube having a circular cross-section with a filling tube 8 welded on to a side surface and flat-pressing the tube with such a degree of compression that the inner cross-sectional area is less than 20 percent of the original, preferably less than 5 percent of this cross-section.

Figure 2:
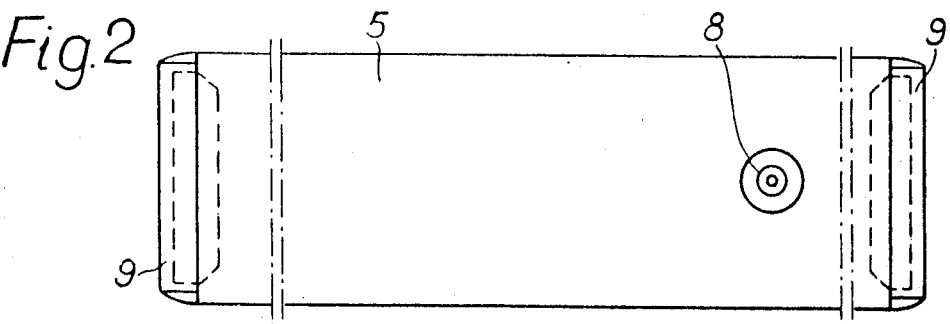
FIG. 2 shows in radial view a pressure tube included in the rotor in FIG. 1 before injection of liquid plastic has started.
Figure 3:
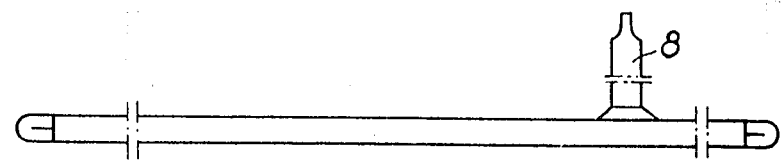
FIG. 3 shows the same pressure tube in a side view.

During the final flat pressing of the pressure tube, stops 10 (FIG. 4) are used for the vertically acting press tool (not shown) with a view to preventing total compression. The horizontally positioned gap 11 shown in FIG. 4 should have a vertical dimension of at least 1 mm. Otherwise the radius of curvature at the edge would be so small and the local deformation, both during compression and the subsequent blowing up of the pressure tube, so great that the tube would crack along one side. Similar problems arise at the ends of the pressure tube, and therefore this should be constructed as shown in FIG. 5, with yokes 9 which are welded on to the flat-pressed pressure tube at the ends. Using only one weld seam at the outermost tube end is not sufficient, since the sharp V-shape the pressure tube end would then attain during high-pressure injection of liquid plastic would produce a risk of fracture. As an extra precautionary measure, the pressure tube should be given a last annealing after the shapes shown in FIGS. 2 and 4 have been achieved.

When a yoke 9 is welded on to the pressure tube end, a razor blade 12 or the like should be inserted into the pressure tube and the yoke, as shown in FIG. 5, to prevent the two legs of the yoke from being welded together.

The pressure tubes 5 are arranged below the slot wedges 4 in such a way that the filling tubes 8 are positioned between two immediately consecutively located slot wedges. Further, the pressure tubes 5 are arranged so that these slot wedges are subjected to radial pressure from the same pressure tube 5 when this tube is put under pressure. Preferably only the pressure tubes are used as connecting members between the slot wedges, but a method according to the invention also comprises cases where strips of high-conductivity material are placed between the wedges 4 and the pressure tubes 5. The wall thickness of the pressure tubes 5 is normally at least one and one-half mm when the material is copper. It may be assumed that it is always advantageous to choose a wall thickness greater than 0.7 mm.

When a pressure tube has been placed in the winding slot with a correct position in relation to the slot wedges, the filling tube is connected by a screw connection 13 to a pressure container 14 containing liquid room temperature curing resin. The container 16 contains oil which is pumped into the pressure cylinder 14 under high pressure. In the cylinder 14 a separation into two layers is caused by the fact that the oil 17, which is lighter than plastic, settles in the top part of the cylinder.

The liquid plastic is pressed into the pressure tube with a pressure chosen within the range of 200 – 800 bar. Lower pressures may also give an acceptable result in certain cases, but not lower than 50 bar. When the pressure of the injected plastic has stabilized at the desired value, a short zone of the filling tube 8 is heated by means of a surrounding electric heating element 18 so that a plug of hardened plastic is formed in the filling tube 8. The connection between the filling tube 8 and the pressure container 14 is broken, and the remaining plastic with additional hardeners is discharged. When all the injected plastic has solidified, the filling tube 8 is cut at the slot wedge surface.

Figure 4:
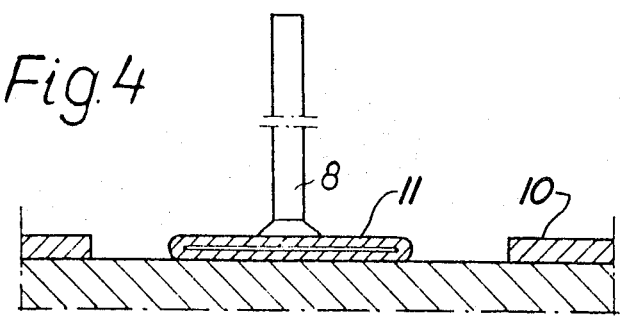
FIG. 4 in cross-section and FIG. 5 a sectional detail of the pressure tube along V — V in FIG. 2.
Figure 5:
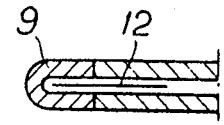
Figure 6:
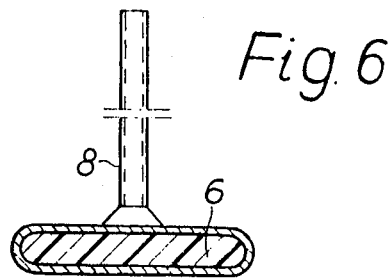
FIG. 6 shows a cross-section of the pressure tube in filled condition.
Figure 7:
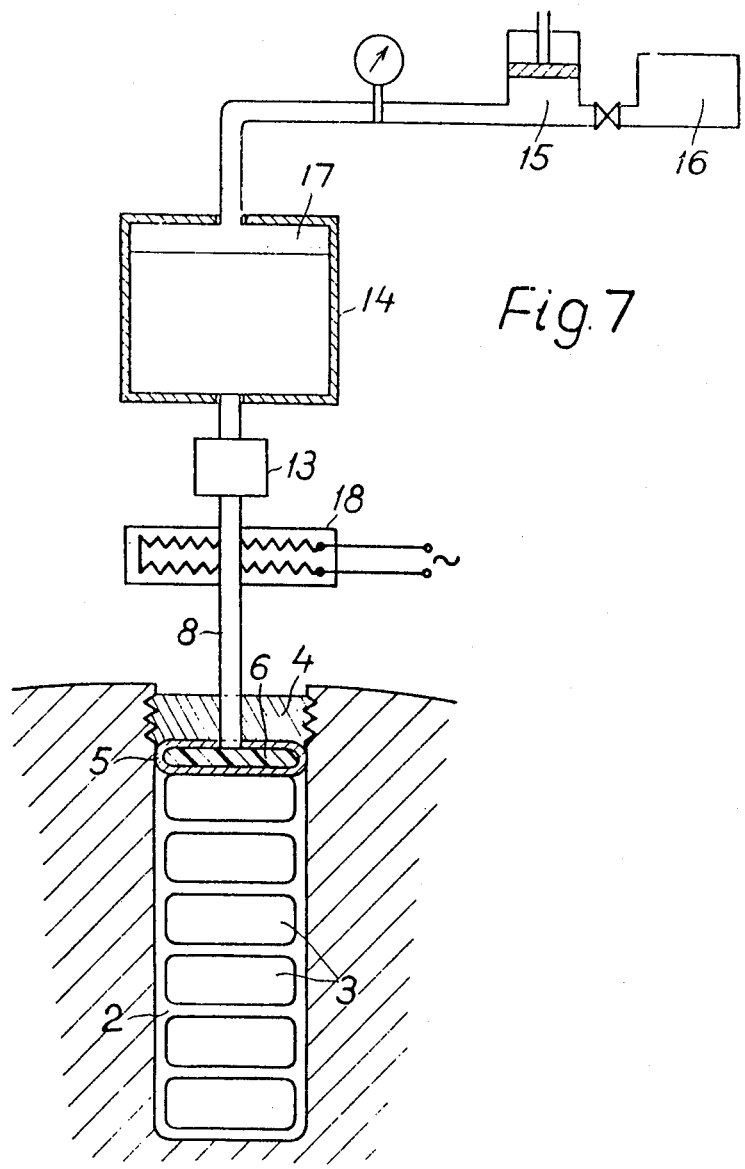
FIG. 7 shows the high-pressure equipment utilized in the method according to the invention.

It is of course possible to use a pressure tube which, immediately before insertion in the slot, has an air gap greater than the 1 mm gap shown in FIG. 4, without the air contained involving any considerable inconvenience.

Generally, at least 85 percent of the increase in volume which occurs when the tube 5 is put under pressure is a plastic deformation of the pressure tube 5. The increase in volume, that is, the increase in the inner volume of the tube, can very well amount to as much as 700 percent If a relatively greater inner volume is used at the beginning, the increase will be smaller, but is should not be less than 50 percent.

I claim:

1. Method of manufacturing a turbo-generator rotor provided with a plurality of rotor slots, comprising a rotor winding in the slots, means securing the winding in the slots, a plurality of axially and consecutively arranged slot wedges (4) of a material of high electrical conductivity, a plurality of slot wedges (4) lying in the same slot, which comprises inserting a pressure tube (5) of a plastically deformable metal, sealed at the ends and furnished with a radially oriented filling tube (8), in a winding slot of a turbo-generator rotor, arranging a plurality of metallic slot wedges (4) at the top of each slot outside said tube, said filling tube projecting radially between two of said slot wedges, connecting said filling tube (8) to a pressure container (14), injecting a thermosetting resin from the pressure container into the pressure tube with a pressure in the range of 200–800 bar and in sufficient quantity to increase the pressure tube volume by at least 50 percent, mainly by means of plastic deformation of the tube material, elastic deformation being restricted to the initial stage of expansion and constituting at the most 15 percent of the total deformation, and allowing the injected thermosetting resin to solidify under pressure.

2. Method according to claim 1, in which a part of the filling tube, after a sufficient amount of plastic has been supplied to the pressure tube, is subjected to local forced heating so that a plug of hardened plastic is formed, and thereafter cutting off the filling tube between the plug and said pressure container.

* * * * *